(No Model.)

J. G. THOMAS.
FASTENER FOR WIRE STAYS.

No. 602,783. Patented Apr. 19, 1898.

Witnesses
John Enders Jr.
Royal E. Burnham.

Inventor
John G. Thomas,
By L. Deane & Son
his Attorneys

UNITED STATES PATENT OFFICE.

JOHN G. THOMAS, OF LIMA, OHIO.

FASTENER FOR WIRE-STAYS.

SPECIFICATION forming part of Letters Patent No. 602,783, dated April 19, 1898.

Application filed July 29, 1897. Serial No. 646,378. (No model.)

*To all whom it may concern:*

Be it known that I, JOHN G. THOMAS, a citizen of the United States, residing at Lima, in the county of Allen and State of Ohio, have invented certain new and useful Improvements in Fasteners for Fence-Stays; and I do hereby declare the following to be a full, clear, and exact description of the invention, such as will enable others skilled in the art to which it appertains to make and use the same.

My invention relates to improvements in devices for connecting the vertical stays of wire fences with the horizontal strands or wires; and its object is to provide an improved construction of the same which can be produced at a very small cost and be readily applied to the fence so as to securely connect the stays and wires without any liability of accidental disengagement, but which can be easily removed when desired.

The invention consists in the novel construction and combination of parts hereinafter fully described and claimed.

Figure 1:
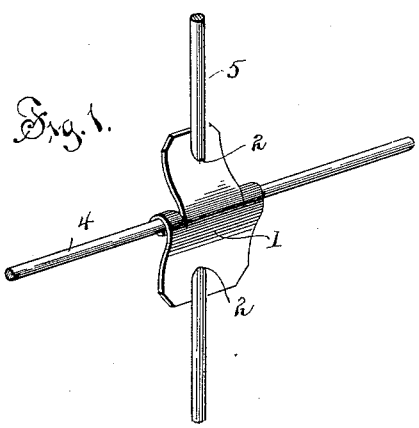
Figure 2:
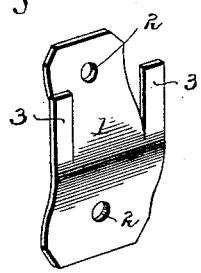

In the accompanying drawings, Figure 1 is a perspective view of a fastener for the stays of wire fences connected in accordance with my invention, showing the same as it appears in use. Fig. 2 is a similar view showing the fastener disengaged from the fence and the tongues before they are bent around the strands.

In the said drawings the reference-numeral 1 designates a metal plate formed with a bend at the center and the ends extended laterally outward and formed with holes or apertures 2 for the passage of the stay. At opposite sides of the plate and in line with the center thereof are two tongues 3, made integral with said plate, the ends of which are bent into cylindrical loops.

The numeral 4 designates the horizontal strands or wires, and 5 the stays, which may be of any ordinary or suitable construction.

In carrying the invention into effect the fastener is applied to the fence with the horizontal wire resting in the bend in the center of the plate. The stay is then passed through the holes in the plate, and the tongues are then bent around the horizontal wire, thereby securely holding the fastener in place and connecting the stay with the wire. It will be understood that any number of the fasteners desired may be employed with each stay, but I prefer to provide one at each point where the stay crosses the horizontal wires.

By forming the plate with the central bend the fence-wires will seat therein, so that it will not be necessary to crimp or bend them or the stays at their crossing-points.

Having thus fully described my invention, what I claim is—

1. As an improved article, a fastener for the stays of wire fences, comprising the plate formed with a central bend and the ends extended laterally outward and formed with apertures, and the opposite tongues in a line with the center of the plate, substantially as described.

2. The combination with the horizontal strands of a wire fence and the vertical stays, of the fastener consisting of the plate having a central bend in which said strands are seated, and formed with holes through which the stays pass, and the opposite integral tongues bent around the said strands, substantially as described.

In testimony whereof I affix my signature in presence of two witnesses.

JOHN G. THOMAS.

Witnesses:
JACOB CUSTER,
JAMES PILLARS.